United States Patent
McDaniel et al.

(10) Patent No.: US 8,429,818 B2
(45) Date of Patent: Apr. 30, 2013

(54) ROD HOLDER FOR THE ASSEMBLY OF HEAT EXCHANGERS

(75) Inventors: Douglas C. McDaniel, Marshalltown, IA (US); Robert G. Oetker, Marshalltown, IA (US)

(73) Assignee: Lennox Industries Inc., Richardson, TX (US)

( * ) Notice: Subject to any disclaimer, the term of this patent is extended or adjusted under 35 U.S.C. 154(b) by 960 days.

(21) Appl. No.: 12/501,745

(22) Filed: Jul. 13, 2009

(65) Prior Publication Data
US 2011/0005067 A1    Jan. 13, 2011

(51) Int. Cl.
*B21D 39/08* (2006.01)

(52) U.S. Cl.
USPC ....... 29/890.044; 29/726; 29/727; 29/890.03; 29/890.043; 72/402; 72/462; 72/481.1

(58) Field of Classification Search ..... 29/727, 29/890.044, 890.03, 890.043; 72/402, 462, 72/481; 277/606, 924; 279/41 R, 46 R, 93
See application file for complete search history.

(56) References Cited

U.S. PATENT DOCUMENTS

| | | | |
|---|---|---|---|
| 3,688,533 A | 9/1972 | Ames | |
| 4,581,817 A * | 4/1986 | Kelly | 29/727 |
| 4,734,972 A | 4/1988 | Hawkins | |
| 4,771,536 A | 9/1988 | Vanderlaan et al. | |
| 4,780,955 A | 11/1988 | Stroup | |
| 4,980,966 A | 1/1991 | Milliman et al. | |
| 5,040,405 A * | 8/1991 | Honma et al. | 72/462 |
| 5,651,570 A | 7/1997 | Schrum et al. | |
| 6,176,006 B1 | 1/2001 | Milliman et al. | |
| 2002/0069515 A1 | 6/2002 | Maggiolo | |

FOREIGN PATENT DOCUMENTS

EP    1787715 A1    11/2005

* cited by examiner

*Primary Examiner* — Richard Chang

(57) ABSTRACT

One aspect of this disclosure provides an expansion rod holder for the assembly of fin and tube heat exchangers. The expansion rod holder includes a first plate having a first aperture therethrough and a ring located in the first aperture and that has a second aperture therethrough. The first and second apertures are configured to receive a tapered end of an expansion rod having an annular groove proximate the tapered end. A biasing member is located in the first aperture between the ring and a wall of the first aperture. The biasing member is configured to bias the ring in a first direction toward an opposite wall of the first aperture and into the annular groove. A method of manufacturing the expansion rod holder is also disclosed, as well as a tube expander system used to manufacture heat exchangers.

22 Claims, 5 Drawing Sheets

ROD HOLDER FOR THE ASSEMBLY OF HEAT EXCHANGERS

TECHNICAL FIELD

This application is directed, in general, to a tube expander machine and, more specifically, to a device for locking and releasing tube expander rods for a heat exchanger.

BACKGROUND

In the manufacture of heat exchangers, one method in common use is to assemble fins on tubes with a loose fit and then expand the tubes to produce a tight fit with the fins and permanently lock the assembly together. This also provides good heat exchange contact between the tubes and the fins.

Generally, expander machines provide a frame having an assembly fixture or nest at one end for holding the loosely assembled tubes and fins and a powered header or ram at the other end. Mounted on the powered ram is a plurality of expander rods aligned with the tubes in the fixture or nest. The ends of the rods are formed with expander ends, or bullets, sized to move along the tube as the ram advances and to expand the tube into tight fitting engagement with the openings in the fins.

One common method of securing the expander rods to the powered header is to insert the rods into selected apertures in the header and rotate the rods 180°, the rods having a halfgroove milled into one side of the rod near the upper, tapered end. Therefore, inserting or removing the rods to convert to a different heat exchanger pattern requires each rod to be twisted and removed or, inserted and twisted to secure it in the header. All of this repetitive motion of twisting is done by hand and often results in the repetitive stress injury (RSI) known as carpal tunnel syndrome and also requires additional manufacturing time and effort, thereby increasing manufacturing costs.

Therefore, what is needed is a device and method for securing and removing the expander rods in the header without creating an RSI scenario.

SUMMARY

One aspect of this disclosure provides an expansion rod holder for the assembly of fin and tube heat exchangers. In one embodiment, the expansion rod holder comprises a first plate having a first aperture therethrough and a ring located in the first aperture and that has a second aperture therethrough. The first and second apertures are configured to receive a tapered end of an expansion rod having an annular groove proximate the tapered end. A biasing member is located in the first aperture between the ring and a wall of the first aperture. The biasing member is configured to bias the ring in a first direction toward an opposite wall of the first aperture and into the annular groove. A method of manufacturing the expansion rod holder is also disclosed, as well as a tube expander system used to manufacture heat exchangers.

BRIEF DESCRIPTION

Reference is now made to the following descriptions taken in conjunction with the accompanying drawings, in which.

DETAILED DESCRIPTION

Figure 1:
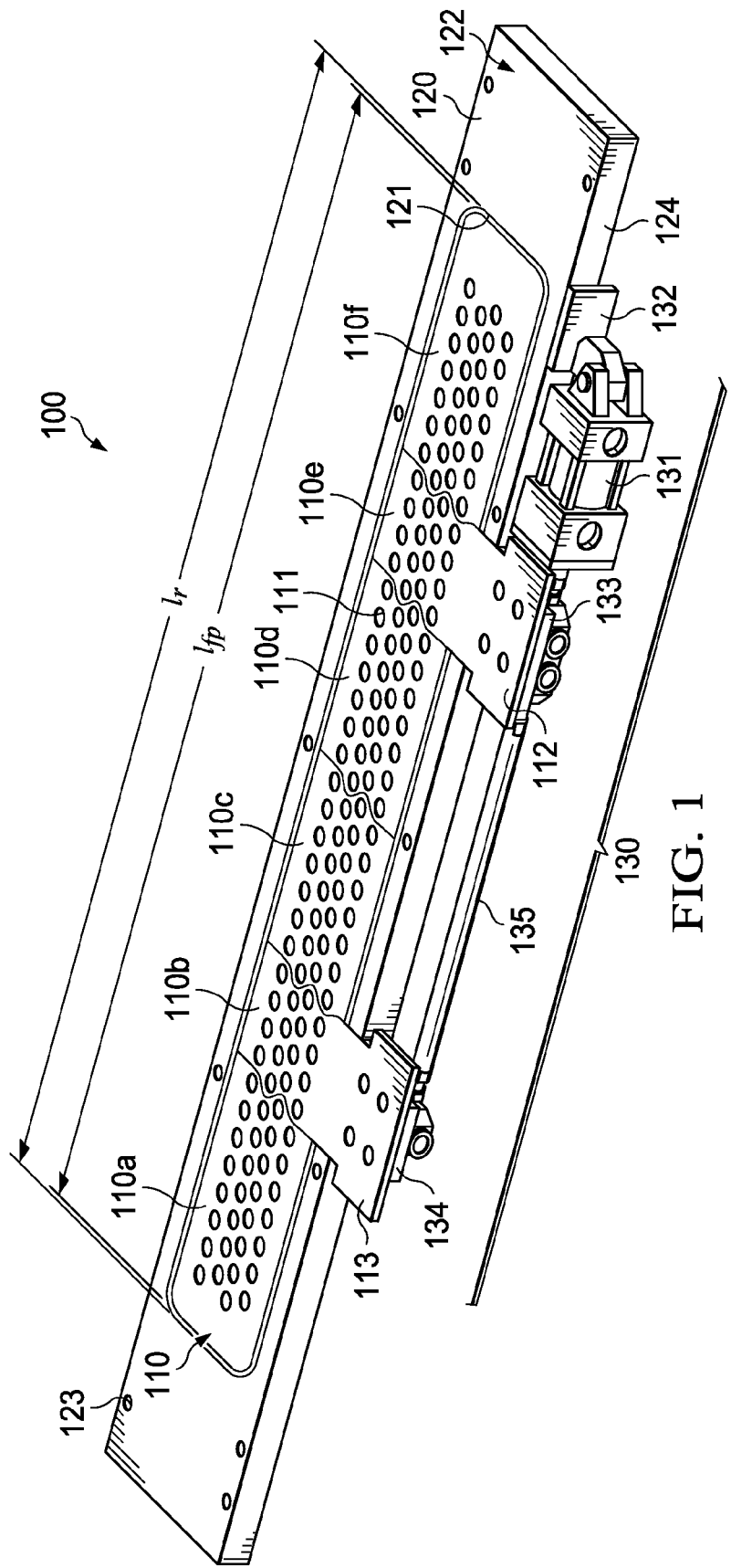
FIG. 1 illustrates one embodiment of an expansion rod holder for the assembly of fin and tube heat exchangers as discussed herein.

FIG. 1 illustrates one embodiment of an expansion rod holder 100 for the assembly of fin and tube heat exchangers, as discussed herein. The expansion rod holder 100 comprises a first plate 110, a second plate 120, and a displacement mechanism 130. The first plate 110 comprises a plurality of apertures 111 therethrough and first and second tongues 112, 113. The plurality of apertures 111 may be arranged in a pattern replicating a general cross section for a family of heat exchangers (not shown). For example, the illustrated plurality of apertures 111 arranged in four offset rows of 36 apertures alternating with rows of 37 apertures, i.e., 36 apertures, 37 apertures, 36 apertures, and 37 apertures. The exact number is not important, nor is the layout, so long as the pattern is large enough to accommodate the number of tubes to be expanded within a like number of fins ultimately to be formed into a heat exchanger. The first plate 110 shown comprises six partial plates 110a-110f that are interlocked as in the pieces of a jigsaw puzzle. However, the first plate 110 need not be made from six or any other number of partial plates, but may be made in one piece. The illustrated embodiment is convenient to manufacture on tools of a modest size. The availability of larger manufacturing tools may enable the manufacture of the first plate 110 in one piece.

The second plate 120 comprises a cavity 121 in the upper surface 122 in which the first plate 110 is located. In a preferred embodiment, the cavity 121 may be a rabbet having a length $l_r$ that is longer than the first plate length $l_{fp}$. The second plate 120 may further comprise a plurality of mounting apertures 123 for mounting to a ram header (not shown) of a mechanical tube expander. In a preferred embodiment, the cavity 121 has a depth substantially equal to a thickness of the first plate 110, such that the upper surface of the first and second plates 110 and 120 are substantially coplanar.

In another embodiment, the expansion rod holder 100 may include a displacement mechanism 130 that is operatively coupled to the first and second plates 110 and 120. The displacement mechanism 130 is configured to provide a mechanical force to shift the first plate 110 with respect to the second plate 120. In one embodiment, the displacement mechanism 130 may comprise an actuator 131, an attachment bracket 132, first and second tongue brackets 133, 134 and a connecting rod 135. The displacement mechanism 130 is coupled to the second plate 120 at an edge 124 thereof with attachment bracket 132. The displacement mechanism 130 is also coupled to the first plate 110 at the first and second tongues 112, 113 with the first and second tongue brackets 133, 134. The connecting rod 135 couples the first and second tongue brackets 133, 134 so as to precisely adjust the distance between the first and second tongues 112, 113 so that the first plate 110 remains planar during sliding operation. In one embodiment, the connecting rod 135 may be threaded as in a turnbuckle, i.e., left handed threads on one end and right handed threads on the other end, so that rotating the connecting rod 135 in one direction shortens the distance between the first and second tongues 112, 113 and shifts the first plate 110 to the right with respect to the second plate 120, and rotating the connecting rod 135 in the opposite direction lengthens the distance between the first and second tongues 112, 113 to shift the first plate 110 in the opposite direction. However, in another embodiment, the actuator 131 may be a hydraulic operated device that pulls or pushes the rod 135 in the desired direction. In yet another embodiment, the actuator may simply be an appropriately levered handle that allows the plate 110 to be shifted in the appropriate direction when the handle is moved or biased in the appropriate direction. Examples of other embodiments of the displacement mechanism 130 are discussed below.

Figure 2:
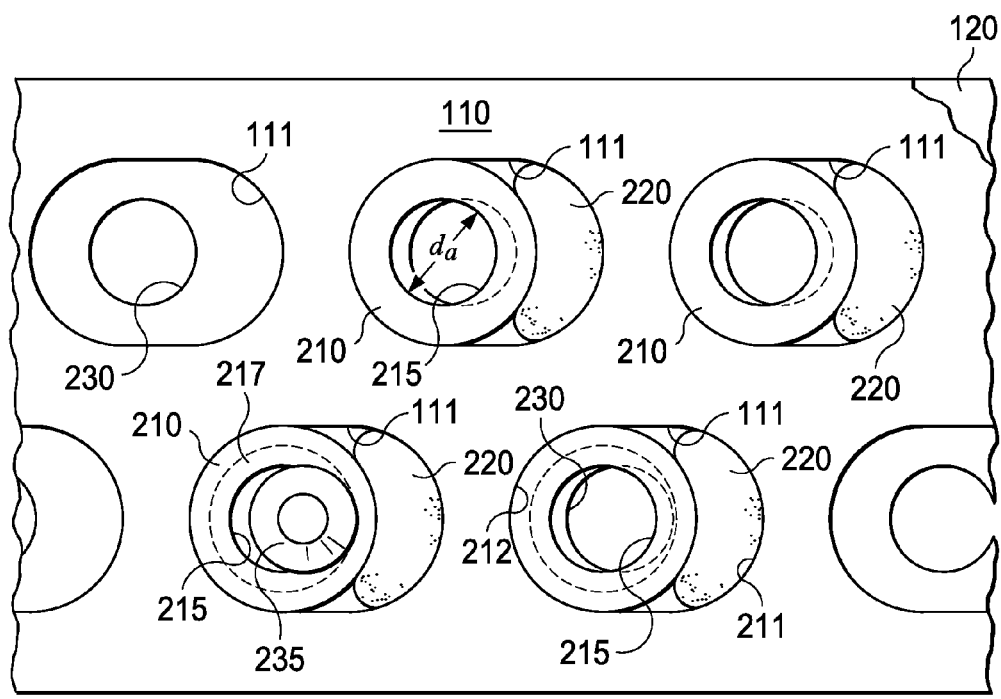
FIG. 2 illustrates one embodiment of the first plate having the plurality of first apertures therethrough.

FIG. 2 illustrates one embodiment of the first plate 110 having the plurality of first apertures 111 therethrough. Portions of the second plate 120 may be seen through the first apertures 111 as well as second plate apertures 230 through which ends of expansion rods 235 can be inserted. In a preferred embodiment, the first apertures 111 are elongated along the length of the first plate 110 to provide optimal spacing of adjacent rows of the first apertures 111. Within each of the first apertures 111 is located a ring 210 and a biasing member 220, as illustrated. The biasing member 220 is comprised of a resilient material that is capable of exerting a force when compressed. For example, in an advantageous embodiment, the biasing member 220 may be comprised of rubber or similar elastic material capable of exerting a force when compressed.

In one embodiment, the rings 210 and biasing members 220 are substantially co-planar with the first plate 110. However, in other embodiments, the upper surfaces of the rings 210 and biasing members 220 may be located below the upper surface of the first plate 110. In one embodiment, the rings 210 and biasing members 220 are of a thickness substantially equal to a thickness of the first plate 110. However, in other embodiments, their thickness may be thinner than the first plate 110.

The rings 210 have central second apertures 215 therethrough. The central second apertures 215 have a diameter $d_a$. The rings 210 may also have beveled sections 217 as part of the interior wall of the central second apertures 215. The biasing members 220 are located in the first apertures 111 between one wall 211 of the first apertures 111 and the ring 210 associated therewith. As generally illustrated in FIG. 2, the biasing members 220 are configured to bias the ring 210 in a first direction toward an opposite wall 212 of the first aperture 111 and an annular groove 315 (See FIG. 3A) of the expansion rod 235, as generally illustrated in FIG. 2.

Figure 3A:
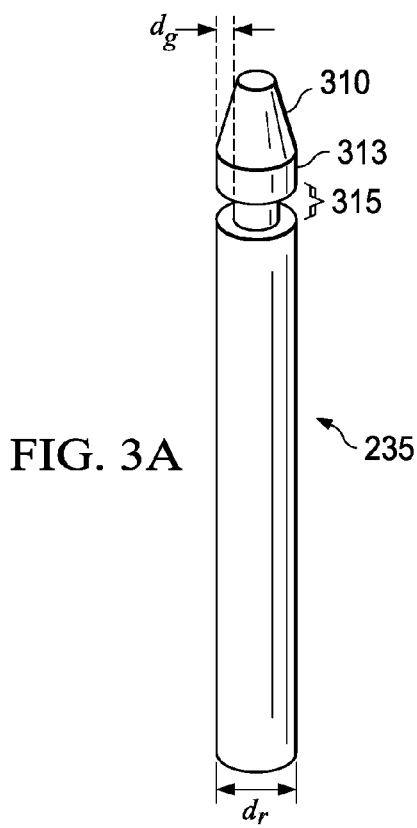
FIG. 3A illustrates one embodiment of a tapered end of an expansion rod configured to cooperate with the expansion rod holder of FIG. 1.

FIG. 3A illustrates one embodiment of a tapered end 310 of the expansion rod 235 configured to cooperate with the expansion rod holder 100 of FIG. 1. The expansion rod 235 has a diameter $d_r$. The end 310 is tapered to simplify insertion into the expansion rod holder 100. When the tapered end 310 terminates, the expansion rod 235 has a region 313 of full rod diameter $d_r$. Proximate the tapered end 310 at an end of region 313 is an annular groove 315. The expansion rod 235 diameter $d_r$ is slightly smaller than the central second aperture diameter $d_a$, thereby enabling the tapered end 310 to pass readily therethrough. In a preferred embodiment, the difference between the length of the cavity 121 and the length of the first plate 110 is substantially equal to a depth $d_g$ of the annular groove 315. This dimensional relationship allows for precise movement of the first plate 110 with respect to the second plate 120 to allow the rods 235 to be cooperatively secured into place by the ring 210 cooperating with the biasing member 220 and removed from the plate 110 by using the displacement mechanism 130 (FIG. 1).

Figure 3B:
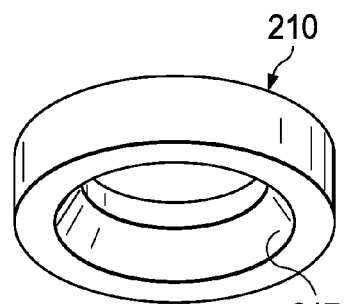
FIG. 3B illustrates one embodiment of the ring of the expansion rod holder of FIG. 1.

FIG. 3B illustrates an advantageous embodiment of the ring 210. The ring 210 has a thickness and cross section that cooperates with the annular groove 315 to retain the expansion rod 235 in the expansion rod holder 100 (FIG. 1). As seen in the embodiment of FIG. 3B, the ring 210 may also include a beveled section 217, which helps to guide the insertion of the tapered end 310 into the respective apertures 111 and 215 of the plate 110 and the rings 210.

Figure 4:
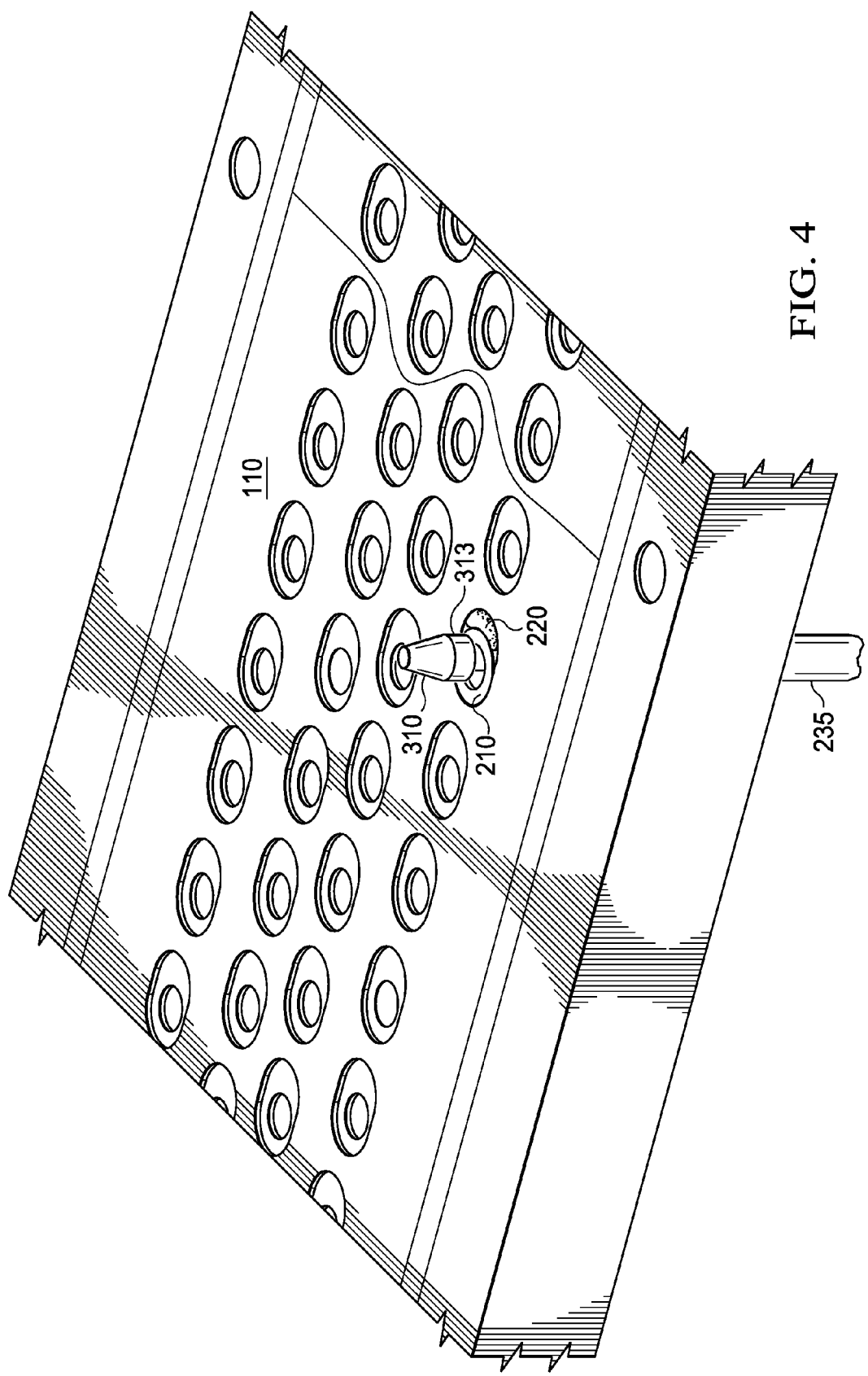
FIG. 4 illustrates a portion of the first and second plates with one expansion rod locked in place.

FIG. 4 illustrates a portion of the first and second plates 110, 120 with one expansion rod 235 locked in place. As can be seen, the tapered end 310 and the region 313 of full rod diameter $d_r$ are seen extending above the first plate 110. The expansion rod 235 is held in place by the ring 210 under the force exerted by the biasing member 220.

To recap, referring now simultaneously to FIGS. 2, 3A, 3B and 4, the tapered end 310 of the expansion rod 235 is inserted through the aperture 230 of the second plate 210 and then simultaneously through the ring aperture 215 and the first plate aperture 111. As the tapered end 310 contacts the beveled section 217 of the ring 210, the ring 210 slides toward the one wall 211 and is resisted by resilient biasing member 220. In one embodiment, the resilient biasing member 220 is an arcuate, resilient member comprising a rubber segment with suitable compression and resiliency characteristics. As the expansion rod 235 is further inserted, region 313 comes smoothly into contact with interior wall 215 and the expansion rod 235 is therefore centered in the second plate aperture 230 and the ring 210. Further insertion of the expansion rod 235 results in the ring 210 sliding into the annular groove 315, locking the expansion rod 235 in the expansion rod holder 100. This insertion process is repeated for each expansion rod that is needed to form the fin and tube arrangement for the desired heat exchanger.

When the expansion rod arrangement no longer suits the fin and tube heat exchangers being produced, i.e., a new arrangement of expansion rods 235 is needed or rods need to be replaced for some other reason, the expansion rods 235 are released with the aid of the displacement mechanism 130. Referring now back to FIG. 1, it was noted above that the cavity length $l_r$ in the second plate 120 is longer than the first plate 110 length $l_{fp}$. This difference in length allows the first plate 110 to move slightly in the cavity 121 along the second plate 120. It should be noted that the second plate 120, in one embodiment, may be secured to a hydraulic head which will be described below that exerts the necessary force to cause the expansion rods 235 to pass through the tubes, expanding them into contact with the fins.

The displacement mechanism 130 shifts the first plate 110 with respect to the second plate 120 in the cavity 121 to release the expansion rods 235 from the rings 210 in the first plate 110. In a preferred embodiment, the displacement mechanism 130 is a hydraulically-operated displacement mechanism. A hydraulically-operated displacement mechanism is a displacement mechanism wherein hydraulic pressure is used to cause the relative motion between the first plate 110 and the second plate 120. When the expansion rods 235 are held by the rings 210, the first plate 110 is shifted toward the left in FIG. 1 by the biasing members 220. When hydraulic pressure is applied to hydraulic actuator 131, the hydraulic pressure causes first tongue bracket 133, connecting rod 135 and second tongue bracket 134 to move in unison to the right in FIG. 1 in relation to stationary attachment bracket 132 attached to the second plate 120. The movement of first and second tongue brackets 133, 134 causes the first and second tongues 112, 113 and the first plate 110 to displace to the right relative to the second plate 120.

Once the first plate 110 has displaced to the right, the resilient biasing members 220 are compressed between the one wall 211 and the ring 210, and the second aperture 215 aligns with the second plate aperture 230, thereby allowing the expansion rods 235 to be withdrawn vertically from the expansion rod holder 100. Upon releasing hydraulic pressure in the actuator 131, the rings 210 will shift to the left in the first apertures 111 as a result of the force applied by the biasing members 220.

In an alternative embodiment, the displacement mechanism 130 may be a mechanical displacement mechanism. A mechanical displacement mechanism uses one or more mechanical devices, e.g., a lever, screw or other simple mechanical means well known to those of skill in the art, to shift the first plate 110 in the cavity 121. In yet another alternative embodiment, the displacement mechanism 130 may be an electrical displacement mechanism. An example of an electrical displacement mechanism would be an electromagnetic field applied to suitable material, i.e., steel, iron, ferromagnetic, etc., coupled to the first and second tongue brackets 133, 134 to shift the first plate 110 in the cavity 121.

Figure 5A:
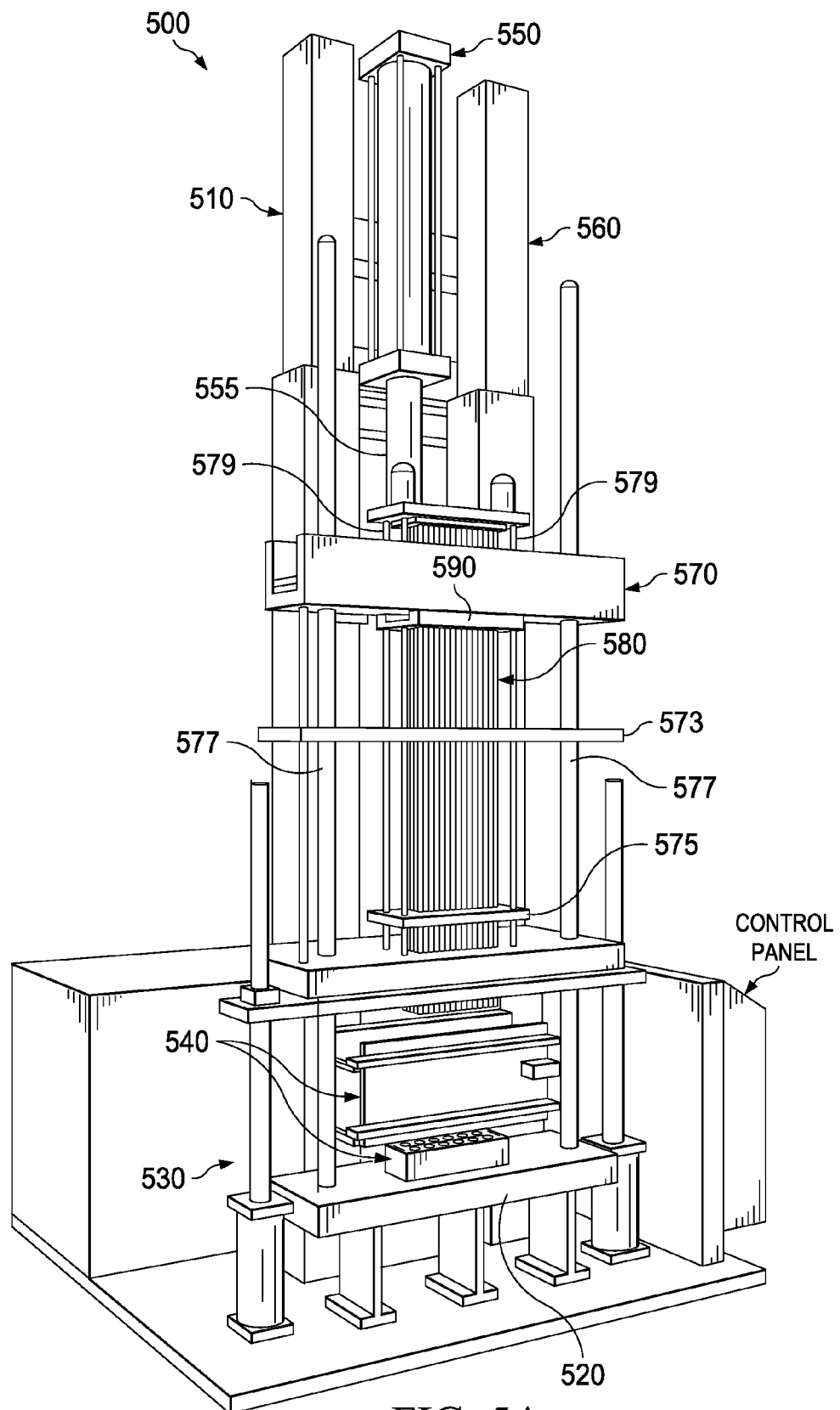
FIG. 5A illustrates one embodiment of a mechanical tube expander employing a rod holder for manufacturing heat exchangers constructed according to the principles of the present invention.
Figure 5B:
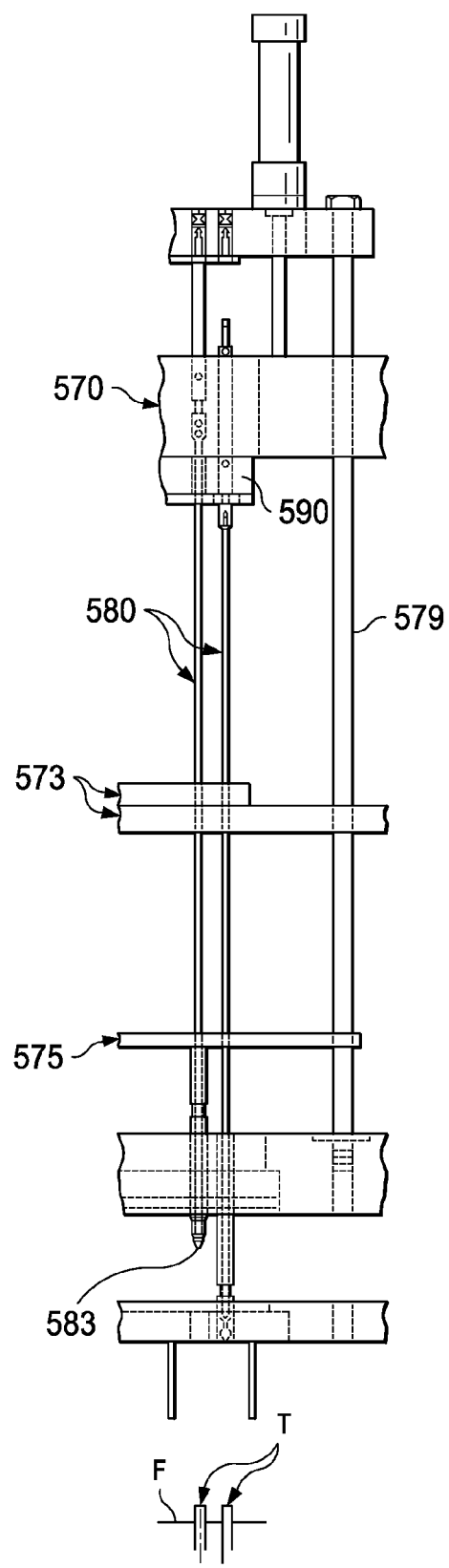
FIG. 5B is an enlarged view of a portion of the mechanical tube expander with the components oriented in a first position.

FIGS. 5A and 5B illustrate a mechanical tube expander 500 employing a rod holder for manufacturing heat exchangers constructed according to the principles of the present invention and an enlarged elevation view of a portion of the mechanical tube expander with the components oriented in a first position. The mechanical tube expander 500 comprises an upstanding frame 510 having a base plate 520 oriented adjacent the lower end 530 thereof having conventional structure 540 for holding on the base plate 520 an assembly of a plurality of fins F and like plurality of tubes T, the fins F being loosely stacked on the tubes T and supported by the aforesaid structure 540.

A ram drive cylinder 550 is mounted on the upstanding frame 510 adjacent the upper end 560 thereof. The ram drive cylinder 550 has an elongate ram 555 whose longitudinal axis extends vertically. The lower end of the ram 555 is secured to a pressure plate 570 which carries thereon a plurality of expander rods 580 secured in a rod holder 590 constructed according to the principles of the present invention. The expander rods 580 have parallel axes and each of the axes is aligned with an axis of a selected one of the tubes T. Each expander rod 580 has at a lower end thereof an enlarged tube-expanding tip 583. When the ram drive cylinder 550 is activated, the ram 555 will reciprocally drive the pressure plate 570. Any expander rods 580 connected to the rod holder 590 will also be reciprocally driven into the aligned tubes T so that the enlarged tube-expanding tip 583 will expand the tubes T so as to become fixedly engaged with the fins previously loosely stacked on the aforesaid tubes T. The enlarged tube-expanding tips 583 are also known in the art as expander bullets. As illustrated, the expander rods 580 extend through guide plates 573 and 575. Vertical guide rods 579 are provided for guiding the vertical reciprocating movement of the pressure plate 570 and other reciprocal parts of the mechanical tube expander 500. When it is necessary to change the number, spacing or arrangement of the expander rods 580, they are released from the rod holder 590 as described above. Operation of the rod holder 590 to release the expander rods 580 may be effected through the control panel by directing hydraulic pressure to the actuator as described above. The new arrangement of rods 580 is then inserted into the rod holder 590.

The invention disclosed herein is adaptable for use with many varieties of mechanical tube expanders, of which the mechanical tube expanders disclosed in U.S. Pat. Nos. 5,220,722 and 5,353,496 and 6,176,006 are representative examples. The disclosures in the aforesaid three patents are incorporated herein by reference.

Thus, a rod holder for the assembly of fin and tube heat exchangers has been described. The rod holder features easy rod insertion and positive retention as well as convenient release of the rods when reconfiguration is required.

Those skilled in the art to which this application relates will appreciate that other and further additions, deletions, substitutions and modifications may be made to the described embodiments.

What is claimed is:

1. An expansion rod holder for an assembly of fin and tube heat exchangers, comprising:
    a first plate having a first aperture therethrough;
    a ring located in said first aperture, said ring having a second aperture therethrough, said first and second apertures configured to receive a tapered end of an expansion rod having an annular groove proximate said tapered end;
    a second plate having a cavity in a surface thereof, said cavity configured to receive said first plate therein and having a third aperture therethrough; and
    a biasing member located in said first aperture between said ring and a wall of said first aperture, said biasing member configured to bias said ring in a first direction toward an opposite wall of said first aperture and into said annular groove.

2. The expansion rod holder as recited in claim 1 wherein said cavity has a length greater than a length of said first plate.

3. The expansion rod holder as recited in claim 2 wherein a difference between said length of said cavity and said length of said first plate is substantially equal to a depth of said annular groove.

4. The expansion rod holder as recited in claim 1 further comprising a displacement mechanism having a first end coupled to said first plate and a second end coupled to said second plate and configured to shift said first plate relative to said second plate in a second direction opposite said first direction.

5. The expansion rod holder as recited in claim 4 wherein said displacement mechanism is a hydraulically-operated displacement mechanism.

6. The expansion rod holder as recited in claim 5 wherein said first plate has first and second tongues extending from a side thereof, and said hydraulically-operated displacement mechanism is coupled to said first plate at said first and second tongues.

7. The expansion rod holder as recited in claim 4 wherein said displacement mechanism is a mechanically-operated displacement mechanism.

8. The expansion rod holder as recited in claim 1 wherein said second aperture is beveled.

9. The expansion rod holder as recited in claim 1 wherein said biasing member is an arcuate resilient member.

10. A method of manufacturing an expansion rod holder for an assembly of fin and tube heat exchangers, comprising:
    providing a first plate having a first aperture therethrough;
    providing a second plate having a cavity in a surface thereof, said cavity configured to receive said first plate therein;
    locating a ring in said first aperture and co-planar with said first plate, configuring said ring with a second aperture therethrough to receive an end of an expansion rod therethrough, said expansion rod having an annular groove proximate said end; and placing a biasing member in said first aperture between said ring and a wall of said first aperture, and configuring said biasing member to bias said ring in a first direction toward an opposite wall of said first aperture and into said annular groove.

11. The method as recited in claim 10 wherein providing said second plate includes providing a second plate wherein said cavity has a length greater than a length of said first plate.

12. The method as recited in claim 11 wherein providing said second plate includes providing a second plate wherein a difference between said length of said cavity and said length of said first plate is substantially equal to a depth of said annular groove.

13. The method as recited in claim 10 further comprising coupling a first end of a displacement mechanism to said first plate and a second end of said displacement mechanism to said second plate, and further configuring said displacement mechanism to shift said first plate relative to said second plate in a second direction opposite said first direction.

14. The method as recited in claim 13 wherein coupling said displacement mechanism includes coupling a hydraulically-operated displacement mechanism.

15. The method as recited in claim 14 wherein said first plate has first and second tongues extending from a side thereof, and said hydraulically-operated displacement mechanism is coupled to said first plate at said first and second tongues.

16. The method as recited in claim 13 wherein coupling said displacement mechanism includes coupling a mechanically-operated displacement mechanism.

17. The method as recited in claim 10 wherein placing said ring includes placing a ring wherein said second aperture is beveled.

18. The method as recited in claim 10 wherein placing said biasing member includes placing an arcuate resilient member.

19. A mechanical tube expander system for manufacturing fin and tube heat exchangers, comprising:

an upstanding frame having upper and lower ends;

a ram drive cylinder mounted on said upstanding frame proximate said upper end;

an expansion rod holder coupleable to said ram drive cylinder having:

a first plate having a first aperture therethrough;

a second plate having a cavity in a surface thereof, said cavity configured to receive said first plate therein, and wherein said cavity has a length greater than a length of said first plate;

a ring located in said first aperture, said ring having a second aperture therethrough and configured to receive an end of an expansion rod therethrough, said expansion rod having an annular groove proximate said end; and a biasing member located in said first aperture between said ring and a wall of said first aperture, said biasing member configured to bias said ring in a first direction toward an opposite wall of said first aperture and into said annular groove; and a base plate proximate said lower end, said base plate having a tube and fin support structure thereon.

20. The system as recited in claim 19 wherein a difference between said length of said cavity and said length of said first plate is substantially equal to a depth of said annular groove.

21. The system as recited in claim 19 further comprising a displacement mechanism having a first end coupled to said first plate and a second end coupled to said second plate and configured to shift said first plate relative to said second plate in a second direction opposite said first direction.

22. The system as recited in claim 21 wherein said displacement mechanism is a hydraulically-operated displacement mechanism and wherein said first plate has first and second tongues extending from a side thereof, and said hydraulically-operated displacement mechanism is coupled to said first plate at said first and second tongues.

* * * * *